United States Patent
Yarbrough

(10) Patent No.: US 8,433,647 B1
(45) Date of Patent: Apr. 30, 2013

(54) METHOD AND SYSTEM FOR PROCESSING ELECTRONIC CHECKS

(75) Inventor: Phillip C. Yarbrough, Dallas, TX (US)

(73) Assignee: VECTORsgi, Inc., Addison, TX (US)

( * ) Notice: Subject to any disclaimer, the term of this patent is extended or adjusted under 35 U.S.C. 154(b) by 2034 days.

(21) Appl. No.: 10/925,713

(22) Filed: Aug. 25, 2004

(51) Int. Cl.
*G06Q 40/00* (2012.01)

(52) U.S. Cl.
USPC ............................................ 705/38; 705/35

(58) Field of Classification Search ............ 705/35, 705/38
See application file for complete search history.

(56) References Cited

U.S. PATENT DOCUMENTS

| | | | |
|---|---|---|---|
| 5,265,007 A | 11/1993 | Barnhard, Jr. et al. | |
| 5,583,759 A | 12/1996 | Geer | |
| 5,590,197 A | 12/1996 | Chen et al. | |
| 5,717,868 A | 2/1998 | James | |
| 5,910,988 A | 6/1999 | Ballard | |
| 5,910,989 A | 6/1999 | Naccache | |
| 5,930,778 A | 7/1999 | Geer | |
| 5,987,439 A | 11/1999 | Gustin et al. | |
| 6,016,484 A * | 1/2000 | Williams et al. | 705/39 |
| 6,032,137 A | 2/2000 | Ballard | |
| 6,354,491 B2 | 3/2002 | Nichols et al. | |
| 6,601,761 B1 | 8/2003 | Katis | |
| 6,644,546 B2 * | 11/2003 | George et al. | 235/379 |
| 6,829,597 B1 | 12/2004 | Schaeck et al. | |
| 6,970,855 B2 * | 11/2005 | Das et al. | 705/407 |
| 7,386,511 B2 * | 6/2008 | Buchanan et al. | 705/45 |
| 7,430,537 B2 * | 9/2008 | Templeton et al. | 705/39 |
| 2002/0004760 A1 * | 1/2002 | Yoshida et al. | 705/26 |
| 2004/0143553 A1 * | 7/2004 | Torget et al. | 705/66 |
| 2008/0177660 A1 * | 7/2008 | Abel et al. | 705/42 |

OTHER PUBLICATIONS

Anderson, Julie, Paypal press release, "Paypal passes 20 Million Member Milestone", Oct. 2, 2002.*
"Banking's Role in Tomorrow's Payments System—Payments System Overview," vol. II, Furash & Company, Jun. 1994, 162 pages.

* cited by examiner

*Primary Examiner* — Kirsten Apple
(74) *Attorney, Agent, or Firm* — Fish & Richardson P.C.

(57) ABSTRACT

In one embodiment, software is operable to identify checking account information from a repository, with the checking account information associated with a transaction. The software automatically generates an electronic check image based, at least in part, on the transaction and the identified checking account information. The software is then operable to communicate the electronic check image to a bank of first deposit for deposit.

24 Claims, 3 Drawing Sheets

| RETAIL ACCOUNT NUMBER | NAME | ADDRESS | CHECKING ACCOUNT NUMBER | ABA R/T | LAST CHECK NUMBER | SIGNATURE ON FILE? | ... |
|---|---|---|---|---|---|---|---|
| 1234 | JOHN SMITH | 123 MAPLE | 567813 | 18563820 | 5001 | Y | ... |
| 2468 | MARY JONES | 7031 MAIN | 478241 | 96998157 | 7500 | N | ... |
| 9843 | NICOLE ANDERSON | 3627 LOVERS | 374639 | 46106002 | 8127 | Y | ... |
| ... | ... | ... | ... | ... | ... | ... | ... |

METHOD AND SYSTEM FOR PROCESSING ELECTRONIC CHECKS

TECHNICAL FIELD

This disclosure relates to check processing and, more specifically, to a method and system for processing electronic checks.

BACKGROUND

Currently, a consumer may pay a retailer or other receiving entity with an electronic check for goods or services. This electronic check may then be considered a replacement for or an alternative to a physical check drafted by the consumer. For example, the consumer may initiate the transaction through his bank using financial software. The consumer's bank prints a paper copy of the electronic check, which includes the payee, amount, and check number (as well as other information), for transfer to the receiving entity. The bank then mails or otherwise physically transmits the printed copy to the expected receiving entity. In another example, the consumer may establish an electronic draft from his bank to a retailer. Upon a purchase by the consumer, the retailer communicates the relevant information to a clearing house, which then prints the paper check for transmission to a bank of first deposit. Regardless of the technique, a printed or physical representation of the electronic check are used to deposit the check and normally include a "signature on file" mark in place of the consumer's physical signature.

SUMMARY

This disclosure provides a system and method for processing electronic checks. In one embodiment, for example, software is operable to identify checking account information from a repository, with the checking account information associated with a transaction. The software automatically generates an electronic check image based, at least in part, on the transaction and the identified checking account information. The software is then operable to communicate the electronic check image to a bank of first deposit for deposit.

The details of various embodiments of the disclosure are set forth in the accompanying drawings and the description below. One or more embodiments of the disclosure may include several important technical advantages. For example, the disclosure may allow a receiving entity (or other retail organization or corporation) to process retail transactions without the need for consumer's physical checks or paper representations of electronic checks. Continuing this example, this disclosure may enable the receiving entity to electronically deposit checks or similar retail payments without the need for paper. In other words, the present disclosure may provide the receiving entity with the ability to reduce or eliminate the need for physical checks from the retail transaction through the deposit process, thereby possibly expediting the deposit of the funds from the transaction. In yet another example, the consumer may quickly transact with a retailer through a courtesy card and yet receive a check image, often with a check number, with his bank statement. Of course, certain embodiments of the disclosure may have none, some or all of these advantages. Other features, objects, and advantages of the disclosure will be apparent from the description and drawings, as well as from the claims.

DESCRIPTION OF DRAWINGS

FIG. 2 is an example table storing checking account information in accordance with one embodiment of the present disclosure.

DETAILED DESCRIPTION

Figure 1:
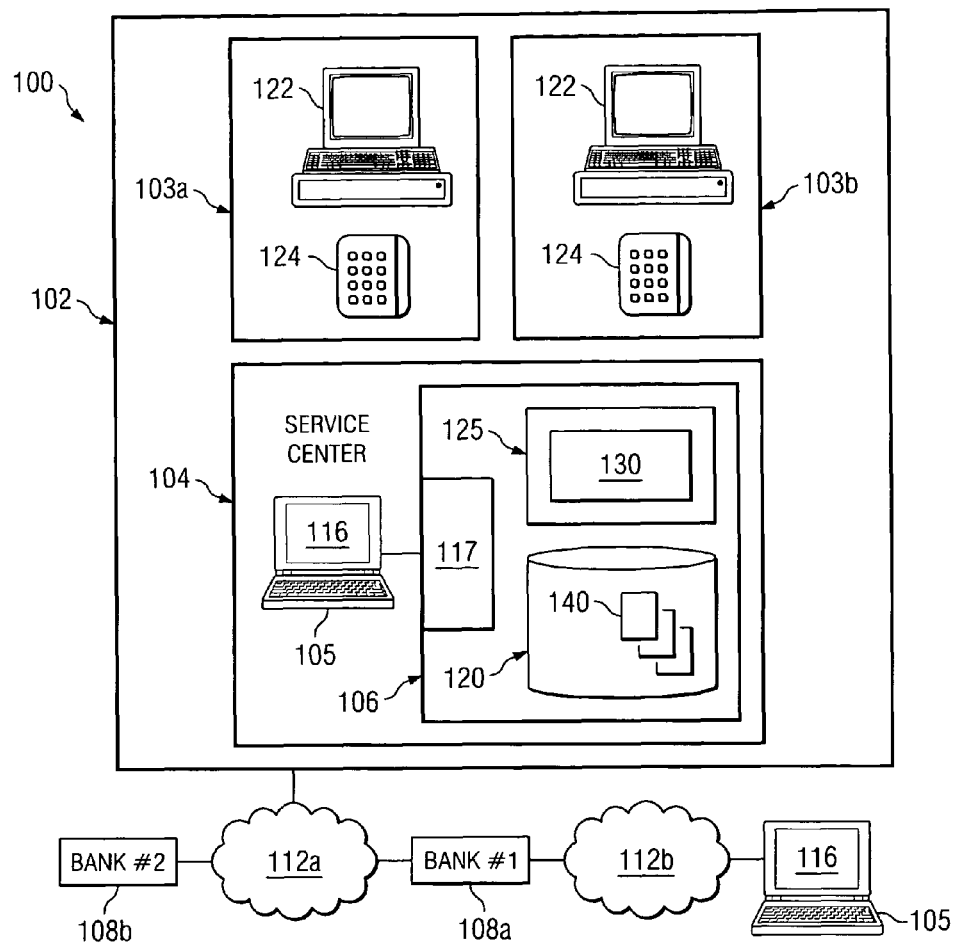
FIG. 1 illustrates a system for depositing electronic check images in accordance with one embodiment of the present disclosure.

FIG. 1 illustrates a system 100 for processing and depositing electronic check images in accordance with one embodiment of the present disclosure. Generally, system 100 includes at least a portion of any retail system operable to process electronic retail transactions, automatically generate at least one electronic check image (often associated with an image replacement document or IRD) from the transaction, and communicate the electronic check image to a bank of first deposit or other financial institution 108. As used herein, an electronic check image may be a digital image of an electronic check, or a file including the image and other information, including the front, the back, both, or any suitable portion thereof. This digital image may not be based on a physical check, but may instead be populated, created, imaged, or otherwise generated based on data from an electronic checking transaction. This check image may be in any suitable format including Moving Picture Experts Group (MPEG), Joint Photographic Experts Group (JPEG), Tag Image File Format (TIFF), including any suitable version thereof (such as TIFF 6.0), and others. The term "dynamically" generally means that certain processing is determined, at least in part, at run-time based on one or more variables. The term "automatically," as used herein, generally means that the appropriate processing is substantially performed by at least part of system 100. It should be understood that "automatically" further contemplates any suitable user or manager interaction with system 100 without departing from the scope of this disclosure.

System 100 is typically distributed into at least one receiving entity (or point-of-sale) 102 and at least one financial institution 108. Often, portions of system 100 are electronically inter-coupled, thereby allowing efficient communications among the various components. Generally, financial institution 108 is any agent, third-party resource, clearing house, branch, processing center, or central office of a bank of first deposit or other similar financial institution. Indeed, while illustrated as two banks, first financial institution 108a and second financial institution 108b respectively, any number of banks and/or other institutions may be included in system 100 without departing from the scope of this disclosure. Moreover, two or more financial institutions 108 may represent two or more ABA routing/transit numbers associated with one bank.

As illustrated, system 100 also includes one or more receiving entities 102. Receiving entity 102 is any organization or person, including a corporation, a privately owned store, an online vendor, a telephony system, outside representative or agent, a local or remote automated teller machine (ATM), or other original recipient, point-of-sale, or location operable to at least partially transact through electronic checks. Receiving entity 102 may also represent a teller at one of the financial institutions 108 without departing from the scope of the disclosure. Receiving entity 102 may also be operable to generate an Automated Clearing House (ACH) transaction based on the retail transaction for quickly processing the transaction with financial institutions 108. Regardless, at any appropriate time and using any suitable automatic or manual technique, receiving entity 102 is normally operable to generate electronic check images based on electronic transactions and deposit these electronic check images with any appropriate financial institution 108. In the illustrated embodiment, receiving entity 102 includes two stores, 103*a* and 103*b* respectively, and a service center 104. But it will be understood that receiving entity 102 may include none, one, or both (as well as other) components without departing from the scope of this disclosure. In other words, receiving entity 102 may be considered a merged point-of-receipt 103 and service center 104 and reference to point-of-receipt 103 and service center 104 is meant to include a singular or standalone receiving entity 102 as appropriate.

Point-of-receipt 103 is any person or entity that receives information associated with electronic checks. For example, point-of-receipt 103 may be a store, an ATM, a hospital, and others. In certain embodiments, point-of-receipt 103 may be operable to generate electronic check images and communicate encrypted or unencrypted electronic check images to a service center 104. Illustrated first point-of-receipt 103*a* includes an electronic cash register (ECR) 122 for receiving and storing physical checks. ECR 122 may be operable to generate electronic check images from scanned physical checks upon receipt. Of course, receiving entity 102 may include other additional or alternative components for processing transactions. For example, point-of-receipt 103 may include one or more card readers 124. Card reader 124 is any suitable device operable to capture or otherwise obtain information from a consumer via, for example, his retail or courtesy card, a key card, a drivers license, and such. For example, card reader 124 may be a scanner, a key card reader, an automated teller machine (ATM), a debit or credit card machine, check reader or sorter, or any other similar device (or combination thereof) that can at least partially process a retail transaction or identify checking account information (such as through a retail courtesy account). Card reader 124 may also be operable to receive an electronic signature or scan a physical signature for insertion into the particular electronic check image. In certain embodiments, card reader 124 may be further operable to generate the electronic check images based on the received or identified information.

Example service center 104 is any office, agent, department, data processing center, or other entity or computer operable to provide centralized or managed processing of electronic check image from a plurality of points-of-receipt 103. For example, service center 104 may be a corporate headquarters, a regional management office, a designated point-of-receipt 103, as well as others. Indeed, service center 104 may be unaffiliated with point-of-receipt 103, such as comprising an outsourced data processing organization, without departing from the scope of the disclosure. Moreover, any or all points-of-receipt 103 may act or be operable to perform as service center 104. Illustrated service center 104 includes server 106 and computer 105, but it will be understood that service center 104 may include none, some, as well as other components without departing from the scope of this disclosure.

Server 106 includes memory 120 and processor 125 and comprises an electronic computing device operable to receive, transmit, process, and store data associated with system 100 and, more specifically, receiving entity 102. For example, server 106 may be any computer or processing device such as, for example, a blade server, general-purpose personal computer (PC), Macintosh, workstation, a mainframe, or any other suitable device. Generally, FIG. 1 provides merely one example of servers or computers that may be used with the disclosure. For example, although FIG. 1 illustrates one server 106 that may be used with the disclosure, system 100 can be implemented using computers other than servers, as well as a server pool. In other words, the present disclosure contemplates computers other than general purpose computers as well as computers without conventional operating systems. As used in this disclosure, the term "computer" is intended to encompass a personal computer, workstation, network computer, or any other suitable processing device. Server 106 may be adapted to execute any operating system including Linux, UNIX, Windows Server, or any other suitable operating system. According to one embodiment, server 106 may also include or be communicably coupled with a web server and/or a secure financial server.

Memory 120 may include any memory or database module and may take the form of volatile or non-volatile memory including, without limitation, magnetic media, optical media, random access memory (RAM), read-only memory (ROM), removable media, or any other suitable local or remote memory component. In the illustrated embodiment, memory 120 includes one or more retail account tables 140, but memory 120 may include any appropriate data such as audit information, administration profiles, MICR codes, one or more hash values, an all-items file, and others.

Retail account table 140 includes information associated with a plurality of retail and/or checking accounts, typically provided by a consumer through a paper or online application process. In one embodiment, retail account table 140 may be a temporary file or other data structure used for efficiently associating retail account information with checking account information. In an alternative embodiment, retail account table 140 may be a persistent file used for collecting or storing checking account information such as checking account holder, check account number, and a unique identifier (driver's license number, retail account number, etc.). For example, memory 120 may store checking account information in a relational database, typically including tables defined using SQL statements and interrelated using schemas. In this example, one table may store checking account information and another table may store retail account information. In another example, memory 120 may store checking account information in one or more comma-separated-values (CSV) files, run-time parameters, XML documents, Virtual Storage Access Method (VSAM) files, Btrieve files, text files, encrypted files, object-oriented database data structures, and others.

Server 106 also includes processor 125. Processor 125 executes instructions and manipulates data to perform the operations of server 106 such as, for example, a central processing unit (CPU), a blade, an application specific integrated circuit (ASIC), or a field-programmable gate array (FPGA). Although FIG. 1 illustrates a single processor 125 in server 106, multiple processors 125 may be used according to particular needs and reference to processor 125 is meant to include multiple processors 125 where applicable. In the illustrated embodiment, processor 125 executes image processing engine 130, which performs or executes various check processes such as, for example, techniques described in FIGS. 3A-B.

Image processing engine 130 could include any hardware, software, firmware, or combination thereof operable to, among other things, automatically generate electronic check images from electronic checking transactions. For example, image processing engine 130 may be written or described in any appropriate computer language including C, C++, Java, Perl, Visual Basic, assembler, any suitable version of 4GL, and others or any combination thereof. It will be understood that while image processing engine 130 is illustrated in FIG.

1 as a single multi-tasked module, the features and functionality performed by this engine may be performed by multiple modules such as, for example, an image generation module, a deposit processing module, and an administration module. Further, while illustrated as internal to server 106, one or more processes associated with image processing engine 130 may be stored, referenced, accessed, or executed remotely (such through electronic check register 122 and/or card reader 124). Moreover, image processing engine 130 may be a child or sub-module of another software module (not illustrated) without departing from the scope of this disclosure. In one embodiment, image processing engine 130 may include in or be communicably coupled with a computer 105 or graphical user interface (GUI) 116.

Computer 105 may include any computing device operable to present information to a user such as at point-of-receipt 103 or at home. While not illustrated, computer 105 (as well as ECR 122 or card reader 124) may also include, execute, or present a portion or a version of image processing engine 130 (illustrated in server 106) for performing or implementing depositing or other check processing without departing from the scope of the disclosure. For example, local image processing engine 130 may collect or otherwise identify electronic check images for communication to service center 104 or depositing to financial institution 108. In another example, computer 105 may allow an administrator to log-on to image processing engine 130, monitor a communication of images, communicate the images via an included or referenced file transfer program such as secure FTP. Regardless, computer 105 may be a computer that includes an input device, such as a keypad, touch screen, mouse, or other device that can accept information, and an output device that conveys information associated with the operation of server 106, financial institutions 108, or receiving entities 102, as appropriate. Both the input device and output device may include fixed or removable storage media such as a magnetic computer disk, CD-ROM, or other suitable media to both receive input from and provide output to users through the display, namely GUI 116.

GUI 116 comprises a graphical user interface operable to allow the user of the workstation to interface with at least a portion of system 100 for any suitable purpose. Generally, GUI 116 provides the user of computer 105 with an efficient and user-friendly presentation of data provided by or communicated within system 100. GUI 116 may comprise a plurality of customizable frames or views having interactive fields, pull-down lists, and buttons operated by the user. In one embodiment, GUI 116 presents reports that includes the various electronic check information and associated buttons and receives commands from the user via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in system 100 and efficiently presents the results to the user. Server 106 can accept data from computer 105 via the web browser (e.g., Microsoft Internet Explorer or Netscape Navigator) and return the appropriate HTML or XML responses using network 112.

Server 106 may also include interface 117 for communicating with other computer systems or components, such as another server 106 or receiving entity 102, over network 112 in a client-server or other distributed environment. In certain embodiments, server 106 receives electronic check information or retail account data from internal or external senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer servers 106 and any other local or remote computer or component, such as all or a portion of a bank posting systems or other intermediate systems. While illustrated as two networks, 112a and 112b respectively, network 112 may be a continuous network without departing from the scope of this disclosure, so long as at least portion of network 112 may facilitate communications between the requisite parties or components. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation of certain embodiments, point-of-receipt 103 is involved in a retail transaction with a consumer. Point-of-receipt 103 receives retail account information from the consumer, such as through card reader 124. Point-of-receipt 103 communicates this retail account information to server 106, which often resides at service center 104. Image processing engine 130 then receives retail account information from point-of-receipt 103 and identifies the associated checking account information for the consumer using, for example, retail account table 140. In certain embodiments, card reader 124 further communicates information associated with the retail transaction to server 106. Image processing engine 130 then performs any suitable processing using the transaction information in the identified checking account information. For example, image processing engine 130 may verify that the consumer's checking account has sufficient funds for the transaction. In another example, image processing engine 130 may verify account status, such as holds, open or closed, and others. Based on this verification processing, image processing engine 130 may reject the transaction or accept or process the transaction. Returning to the insufficient funds example, receiving entity 102 may deny the transaction or may accept, process, present, or otherwise handle a known or suspected "non-sufficient" transaction as appropriate.

Once the appropriate processing (if any) has been completed, image processing engine 130 automatically generates an electronic check image using the identified checking account information and the transaction information. For example, image processing engine 130 may populate the electronic check image with the ABA routing/transit number, the checking account number, the bank name, the payee name, the checking account holders name, and other check information. In another example, image processing engine 130 may load a default electronic check image and populate the remaining fields using the identified transaction information. Image processing engine 130 may insert a "signature on file" tag into the signature field of the electronic check image, possibly received during retail account enrollment. Alternatively, image processing engine 130 may request an electronic signature during the transaction, which is then inserted into the electronic check image. Moreover, image processing engine 130 may automatically determine the check number for this electronic check image based on the identified checking account information. For example, image processing engine 130 may retrieve a last check number for the checking account from retail account table 140 and increment this number by one for use in the check image. In another example, image processing engine 130 may request the next electronic check number from the appropriate financial institution 108. In certain embodiments, this check number may be selected from among a subset of checks assigned to, selected by, or otherwise associated with retail entity 102. Once all the appropriate check information has been gathered, collected, or otherwise identified, image processing engine 130 populates a data structure to be used in the electronic check image generation. As described above, this electronic check image may be operable to print or otherwise generate an image replacement document. In certain embodiments, once the electronic check image has been suitably generated, image processing engine 130 then deposits this electronic check image without a physical representation of the check at any point during that transaction. For example, image processing engine 130 may generate an electronic deposit including one or more electronic check images for communication to the appropriate financial institution 108.

FIG. 2 is a diagram illustrating an example retail account table 140 in accordance with one embodiment of the present disclosure. In general, system 100 may use retail account table 140 to store and process objects from the queries. In the illustrated embodiment, retail account table 140 is a multi-dimensional data structure that includes at least a plurality of account records. Each record includes multiple example columns. In this example, each record includes a retail account number, a name, an address, a checking account number, ABA routing/transit number, a last check number, and a "signature on file" switch (which may be used to indicate whether an electronic signature is required during the transaction). It will be understood that the illustrated fields are for example purposes only and one or more these fields may not be in retail account table 140 without departing from the scope of this disclosure. In one embodiment, the account record may include a link to another table, such as, for example, a purchase history table. Moreover, retail account table 140 may be separated into multiple tables without departing from the scope of the disclosure. In one embodiment, retail account table 140 is coupled with or referenced by two data structures or objects: a retail account data structure and checking account data structure. In other words, the illustrated retail account table 140 is merely to aid understanding and may not represent certain embodiments, formats, or data structures within the scope of this disclosure.

Figure 3B:
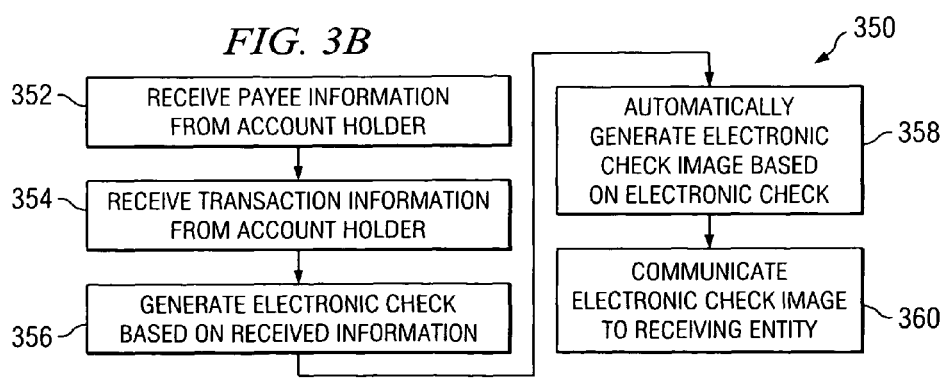
FIGS. 3A-B are flowcharts illustrating example methods for processing electronic checks in accordance with one embodiment of the present disclosure.
Figure 3A:
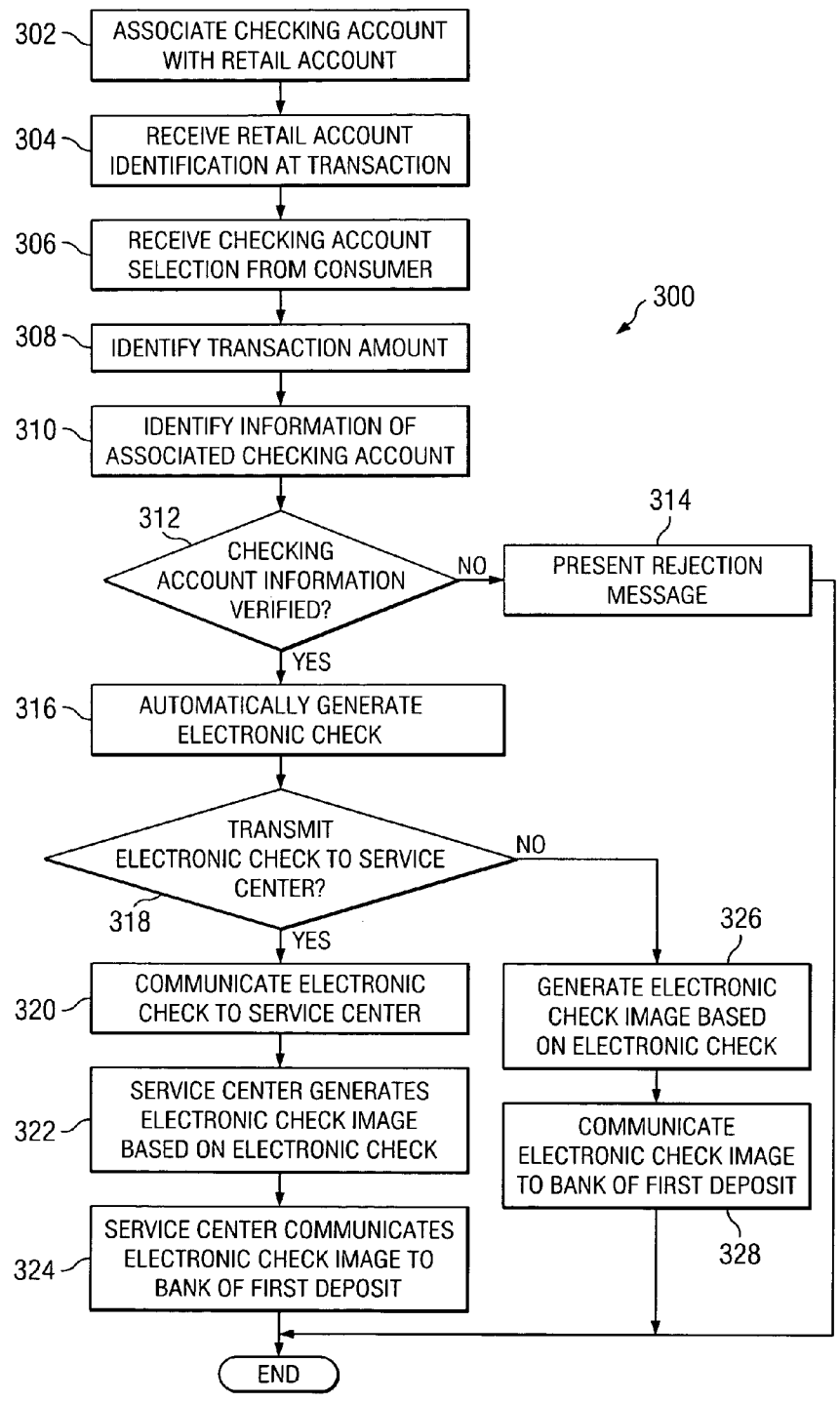

FIGS. 3A-B are flowcharts illustrating example methods, 300 and 350 respectively, for depositing electronic check images at a retail level, such as receiving entity 102, in accordance with one embodiment of the present disclosure. At a high level, method 300 includes image processing engine 130 gathering checking account information based on a retail transaction, automatically generating an electronic check image based on this information, and depositing the image; whereas method 350 includes generating an electronic check image at a financial institution 108 based on user input at computer 105. The following descriptions focus on the operation of image processing engine 130 in performing these methods. But system 100 contemplates using any appropriate combination and arrangement of logical elements implementing some or all of the described functionality. Indeed, while described as at least partially occurring at a retail level store, method 300 may be performed at any appropriate location such as, for example, at an ATM or other standalone receiving entity 102 or financial institution 108, as illustrated by method 350.

Method 300 begins at step 302, where receiving entity 102 associates a checking account with a retail account. For example, a customer may include the checking account information in an online or paper application for a new retail account associated with receiving entity 102. The retail account may be a discount plan, a courtesy account, a frequent buyer account, or any other retail or marketing association. Part of this application process may include the consumer putting his signature on file, providing a blank or voided check to receiving entity 102, and any other suitable tasks. Typically, receiving entity 102 stores this checking account information in retail account table 140. But it will be understood that the checking information may be stored in any appropriate repository such as, for example, a secure server or data center, a dedicated computer, and others. Once approved or otherwise accepted, receiving entity 102 may generate or identify a unique identifier for the consumer (or his family, organization, or business). For example, receiving entity 102 may provide a retail account number, such as a retail courtesy card, to the consumer. In another example, receiving entity 102 may use the consumer's driver's license number, social security number, checking account number, or any other unique or substantially unique identifier.

At this or at any subsequent time, the consumer may then buy or pay for good or services (or perform any other suitable electronic checking transaction) through receiving entity 102. Accordingly, at step 304, point-of-receipt 103 receives a retail account identification from the consumer during the particular transaction. For example, the consumer may swipe a retail account card at checkout. In another example, the consumer may present with his driver's license, which point-of-receipt 103 then uses to locate the retail account. Typically, the consumer is then presented with various payment options, such as checking, credit card, cash, and others. Point-of-receipt 103 then receives a selection indicating that the consumer is paying through his checking account at step 306. At step 308, point-of-receipt 103 identifies the particular transaction amount. Next, point-of-receipt 103 identifies checking account information associated with the particular retail account at step 310. For example, point-of-receipt 103 may communicate the retail account identifier, which was identified earlier, to service center 104 for identification of the checking account information. In certain embodiments, receiving entity 102 may verify the checking account information, as indicated at decisional step 312. This verification may include verifying the ABA routing/transit number, verifying account status (holds, open, and such), verifying that there is sufficient funds in the account to cover the transaction (such as through the ABA routing/transit number and checking account number), and any other suitable verification or authentication. If the checking account is not verified, then point-of-receipt 103 may present a rejection message to the consumer at step 314. Otherwise, receiving entity 102 automatically generates an electronic check at step 316. It will be understood that generation of the electronic check may merely be the population of a temporary data structure, creation of an ACH transaction, or any other suitable process. Moreover, in certain embodiments or based on particular criteria, point-of-receipt 103 may continue to process an unverified or invalidated transaction as appropriate.

Once point-of-receipt 103 has collected or identified the appropriate information, it determines if it should transmit the electronic check information to service center 104 at decisional step 318. If point-of-receipt 103 is to transmit electronic check information to the service center 104 at step 320, then service center 104 generates an electronic check image based on the electronic check information at step 322. As indicated above, the generation of the electronic check image may include identifying one or more fields within a data structure and populating the electronic check image with the identified fields. Next, service center 104 communicates the generated electronic check image to a bank of first deposit or other financial institution 108 at step 324. Returning to decisional step 318, if point-of-receipt 103 is operable to directly deposit with financial institution 108, then it generates an electronic check image based on the electronic check information at step 326. As indicated above, the generation of the electronic check image may include identifying one or more fields within a data structure and populating the electronic check image with the identified fields. Next, point-of-receipt 103 communicates the generated electronic check image to a bank of first deposit or other financial institution 108 at step 328. Part of this communication may include an electronic deposit ticket or header record, often automatically generated.

Method 350 illustrates an alternative technique for receiving entity 102 to process an electronic check image for a particular transaction. In this embodiment, the consumer sends an electronic check to receiving entity 102 through financial institution 108. This electronic check would typically be in the form of an electronic check image generated by financial institution 108 from electronic checking information. For example, method 350 begins at step 352, where financial institution 108 receives payee information from a particular checking account holder. For example, financial institution 108 may receive the payee information via a web site, financial software, a telephony system, or any other system. In the illustrated embodiment, the consumer may use computer 105 to transmit the desired information to financial institution 108. Next, financial institution 108 receives transaction information from the checking account holder at step 354. For example, this transaction information may include a check date, a transaction amount, and others. At step 356, financial institution 108 automatically generates an electronic check based on the received information. As above, this electronic check may be a temporary data structure, a file, an ACH transaction, or any other appropriate logical component. Using the generated electronic check, financial institution 108 generates an electronic check image, in any particular format, based on the identified electronic check information at step 358. Next, financial institution 108 communicates the electronic check image to the payee, illustrated as receiving entity 102, at step 360. At any appropriate point, receiving entity 102 may then deposit the electronic check image using any appropriate technique.

The preceding flowcharts and accompanying descriptions illustrate exemplary methods 300 and 350. In short, system 100 contemplates using any suitable technique for performing this and other tasks. Accordingly, many of the steps in these flowcharts may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. For example, techniques similar to those illustrated may be substantively performed at a cash register. In another example, the receiving entity may use a driver's license or other similar unique identifier to automatically associate checking account information with a particular transaction. Accordingly, the above description of example embodiments does not define or constrain this disclosure. Other changes, substitutions, and alterations are also possible without departing from the scope of this disclosure.

What is claimed is:

1. Software for processing electronic checks comprising computer-readable instructions embodied on tangible media and operable when executed to:
   identify a financial transaction that is not associated with a checking account;
   identify checking account information from a repository to identify checking account information associated with a payor of the transaction;
   automatically generate an electronic checking transaction based, at least in part, on the financial transaction and checking account information;
   automatically generate an electronic check image based, at least in part, on the financial transaction and the identified checking account information, wherein the electronic check image represents the particular checking transaction and operable to generate an image replacement document (IRD); and
   communicate the checking transaction, along with the electronic check image, to a bank of first deposit for deposit into the payee's account.

2. The software of claim 1, wherein the software operable to identify checking account information from a repository comprises software operable to:
   receive retail account information associated with the transaction; and
   select the checking account information based on the retail account information.

3. The software of claim 2, wherein the software operable to receive retail account information at the transaction comprises software operable to identify the retail account information from a retail courtesy card.

4. The software of claim 2, the retail account information selected from a retail account number and the payor driver's license number.

5. The software of claim 1 wherein automatically generating an electronic check image based, at least in part, on the transaction and the identified checking account information comprises populating the electronic check image with transaction amount, payor checking account number, payor checking account routing number, and payee name.

6. The software of claim 1, prior to automatically generating the electronic check image, further operable to verify sufficiency of funds in the payor's checking account.

7. The software of claim 1, the payor comprising a consumer.

8. The software of claim 1 further operable to:
   receive a physical check associated with a second transaction;
   automatically generate a second electronic checking transaction based, at least in part, on the physical check;
   generate a second electronic check image by scanning the physical check; and
   generate an electronic deposit based on the first and second electronic checking transactions.

9. The software of claim 1 further operable to:
   generate a check number based, at least in part, on the checking account information; and insert the generated check number into the electronic check image.

10. The software of claim 1, the checking transaction and the electronic check image being communicated separately to the bank of first deposit.

11. The software of claim 1, wherein a financial transaction that is not associated with a checking account comprises a retail transaction that does not include a debit card number, checking account number, a routing number, or check number.

12. A computer-implemented method for processing electronic checks comprising:
  identifying a financial transaction that is not associated with a checking account;
  identifying checking account information from a repository to identify checking account information associated with a payor of the transaction;
  automatically generating an electronic checking transaction based, at least in part, on the financial transaction and checking account information;
  automatically generating an electronic check image based, at least in part, on the financial transaction and the identified checking account information, wherein the electronic check image represents the particular checking transaction and is operable to generate an image replacement document (IRD); and
  communicating the checking transaction, along with the electronic check image, to a bank of first deposit for deposit into the payee's account.

13. The method of claim 12, wherein identifying checking account information from a repository comprises:
  receiving retail account information associated with the transaction; and
  selecting the checking account information based on the retail account information.

14. The method of claim 13, wherein receiving retail account information at the transaction comprises identifying the retail account information from a retail courtesy card.

15. The method of claim 12 further comprising:
  receiving a physical check associated with a second transaction;
  automatically generating a second electronic checking transaction based, at least in part, on the physical check;
  generating a second electronic check image by scanning the physical check; and
  generating an electronic deposit based on the first and second electronic checking transactions.

16. The method of claim 12 further comprising:
  generating a check number based, at least in part, on the checking account information; and
  inserting the generated check number into the electronic check image.

17. A system for processing electronic checks comprising:
  memory storing information associated with each of a plurality of checking accounts; and
  one or more processors operable to:
    receive a financial transaction that is not associated with a checking account;
    identify checking account information from memory to identify checking account information associated with a payor of the transaction;
    automatically generate an electronic checking transaction based, at least in part, on the financial transaction and checking account information;
    automatically generate an electronic check image based, at least in part, on the financial transaction and the identified checking account information, wherein the electronic check image represents the particular checking transaction and is operable to generate an image replacement document (IRD); and
    communicate the checking transaction, along with the electronic check image, to a bank of first deposit for deposit into the payee's account.

18. The system of claim 17, wherein one or more processors operable to identify checking account information from a repository comprises one or more processors operable to:
  receive retail account information associated with the transaction; and
  select the checking account information based on the retail account information.

19. The system of claim 18, wherein the one or more processors operable to receive retail account information at the transaction comprises one or more processors operable to identify the retail account information from a retail courtesy card.

20. The system of claim 17, the one or more processors further operable to generate a second electronic check image based on a received physical check, the physical check associated with a second transaction and the one or more processors operable to generate an electronic deposit based on the first and second electronic check images.

21. The system of claim 17, the one or more processors further operable to:
  generate a check number based, at least in part, on the checking account information; and
  insert the generated check number into the electronic check image.

22. The system of claim 17, wherein the system comprises a card reader and the memory comprises a remote repository.

23. The system of claim 17, further comprising a reader such that the one or more processors receive the financial transaction via the reader.

24. A system for processing electronic checks comprising:
  means for identifying a financial transaction that is not associated with a checking account;
  means for identifying checking account information from a repository to identify checking account information associated with a payor of the transaction;
  means for automatically generating an electronic checking transaction based, at least in part, on the financial transaction and checking account information;
  means for automatically generating an electronic check image based, at least in part, on the financial transaction and the identified checking account information, wherein the electronic check image represents the particular checking transaction and is operable to generate an image replacement document (IRD); and
  means for communicating the checking transaction, along with the electronic check image, to a bank of first deposit for deposit into the payee's account.

* * * * *